Figure 1:
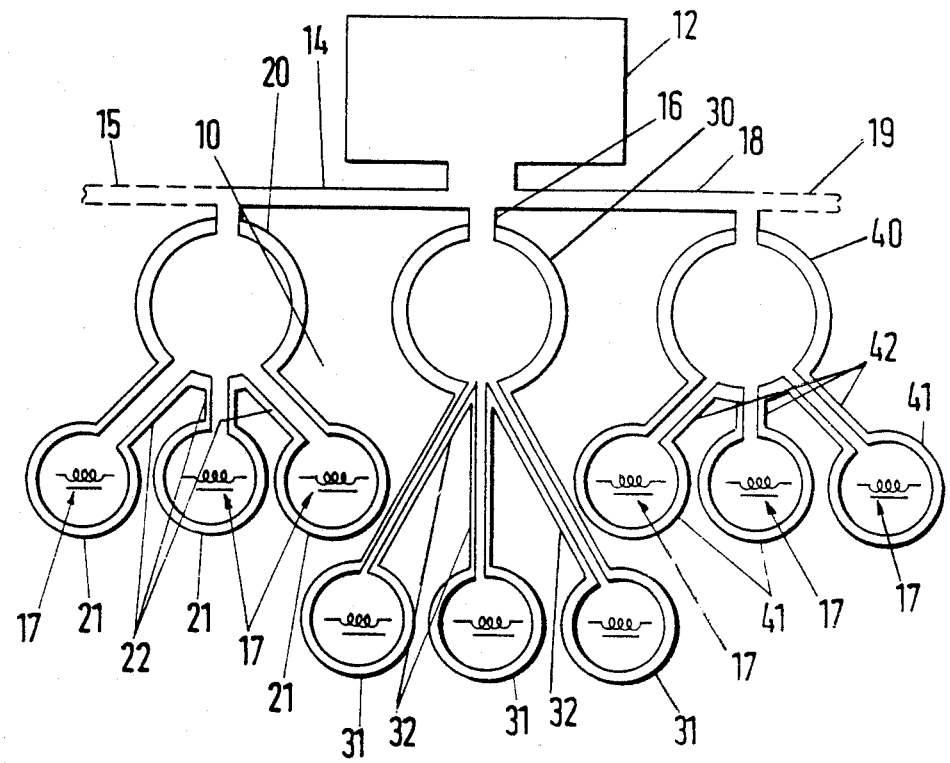

United States Patent [19]

Dustmann

[11] Patent Number: 4,852,367

[45] Date of Patent: Aug. 1, 1989

[54] MAGNET SYSTEM

[75] Inventor: Cord-Henrich Dustmann, Weinheim, Fed. Rep. of Germany

[73] Assignee: Asea Brown Boveri Aktiengesellschaft, Mannheim, Fed. Rep. of Germany

[21] Appl. No.: 285,704

[22] Filed: Dec. 16, 1988

[30] Foreign Application Priority Data

Dec. 18, 1987 [DE] Fed. Rep. of Germany ....... 3743033

[51] Int. Cl.⁴ ........................................... F25B 19/00
[52] U.S. Cl. .................................. 62/51.1; 174/15.4; 335/216; 335/300
[58] Field of Search ..................... 62/514 R; 174/15.4; 335/216, 217, 300

[56] References Cited

U.S. PATENT DOCUMENTS 4,692,560 9/1987 Hotta et al. ......................... 174/15.4
4,702,825 10/1987 Selvaggi et al. ................... 62/514 R
4,788,834 12/1988 Usui et al. ............................ 335/216

*Primary Examiner*—Ronald C. Capossela
*Attorney, Agent, or Firm*—Herbert L. Lerner; Laurence A. Greenberg

[57] ABSTRACT

Conventional superconducting magnet systems supply coolant centrally from a refrigerating system and have a current input provided separately in each case or through special magnets at the beginning and end of a section formed from superconducting electromagnets. The superconducting magnet system of the invention, which is to be used in particular for accelerator units, provides a control cryostat between the refrigerating system and the magnet cryostats encompassing the magnet coils of the electromagnets. The control cryostat at the same time has a current supply lead from which the magnet cryostats associated with the respective control cryostat are supplied with the current necessary for excitation through superconducting cables.

7 Claims, 1 Drawing Sheet

MAGNET SYSTEM

The invention relates to a magnet system including at least one electromagnet having a magnet coil formed of superconducting wire, a cryostat associated with the electromagnet, and a current connection for supplying power for exciting the magnet coil of each electromagnet.

Superconducting magnets are the most important and best-mastered field of application for the technology of superconduction. The advantage of superconducting magnet systems is to be seen, in particular, in the achievable high magnetic flux densities for a comparatively low electrical power requirement and also in their low space requirement and weight, with the simple handling resulting therefrom.

In addition to being used for electrodynamic floating vehicles, the use of superconducting magnet systems is suitable, in particular, for metrological applications, for example accelerator units, bubble chambers, and also, in recent times, for nuclear fusion.

Superconducting magnets for accelerators are connected in series both with respect to their refrigerating circuit and also with respect to their power supply. At the same time, several hundred individual magnets are connected directly to the refrigerating system which maintains the circulation of coolant in the magnets.

The accelerator path is simultaneously subdivided into various sections. In each case, special magnets which have current supply leads are disposed at the beginning and end of the sections. Within these sections, the magnets are connected in series both hydraulically, i.e. with respect to their coolant, as well as electrically. At the same time provision is expediently made for the coolant connecting lines disposed between the magnets to incorporate the electrical connecting lines as well.

In individual superconducting magnets, the current is supplied independently of the coolant supply. However, provision is usually made for the current supply lead to be provided with coolant for cooling from the coolant reservoir of the cryostats associated with the magnet.

In all superconducting magnet systems, the in put points for the electrical current, i.e. the current supply leads already mentioned, have to be specially cooled in order to keep their so-called cryolosses or refrigeration losses as low as possible.

In the magnet configurations of individual magnets, these cryolosses occur at every magnet system since the magnet systems are supplied with current individually and therefore have separate current supply leads In magnet configurations for accelerator units in which the current input is provided through the special magnets situated in each case at the beginning and end of the individual sections, additional cryolosses may also occur in the coolant lines connecting the individual magnets, in particular if the individual magnets are not disposed in close proximity to each other.

It is accordingly an object of the invention to provide a magnet system, which overcomes the hereinaforementioned disadvantages of the heretofore-known devices of this general type, which makes operation possible with as low a refrigeration loss as possible and which does so in a simple manner and at low cost.

With the foregoing and other objects in view there is provided, in accordance with the invention, a magnet system, comprising a refrigerating system supplying refrigerated coolant, first coolant lines connected to the refrigerating system, control cryostats connected to the first coolant lines, second coolant lines connected to the control cryostats, a multiplicity of magnet cryostats each being connected to a respective one of the second coolant lines, a multiplicity of electromagnets each being associated with a respective one of the magnet cryostats and each having a magnet coil formed of superconducting wire, a current supply lead supplying power for exciting the magnet coils, single or individual current connections each being disposed in a respective one of the control cryostats and being connected to the current supply lead, and superconducting cables each being disposed in a respective one of the second coolant lines and each being connected between one of the current connections and a respective one of the magnet coils.

Accordingly, every cryostat of a magnet is connected through a coolant line directly to the control cryostat, with the coolant, which may be liquid helium or liquid nitrogen, for example, being transferred from the control cryostat to the magnet cryostat by means of pressure difference.

The electrical supply, for which the above-mentioned superconducting cables are provided, likewise takes place from the control cryostat through contacts disposed therein.

In accordance with another feature of the invention, all of the electromagnets associated with a given control cryostat are electrically connected in a series current circuit having a beginning and an end in the given control cryostat and having connecting points in the given control cryostat for the superconducting cables In accordance with a further feature of the invention, the superconducting electromagnets associated with a given control cryostat are electrically connected in parallel with each other, the given control cryostat has connecting points disposed therein for the superconducting cables.

In accordance with an added feature of the invention, each given control cryostat forms a beginning and an end of a coolant circuit and the individual superconducting cables for the given control cryostat are interconnected in the given control cryostat.

In accordance with an additional feature of the invention, the control cryostats serve as supply vessels for refrigerated coolant, whereby the magnet cryostats operate independently of the supply of coolant by the refrigerating system. This is of importance in particular if, as a result of unforeseen external factors or internal faults in the refrigerating system, its function is impaired or the coolant supply is interrupted.

In accordance with yet another feature of the invention, the control cryostats are separate units disposed in the vicinity of the magnet cryostats and as near as possible to the electromagnets. This separation proves to be advantageous in relation to its installation and in the event of a repair.

In accordance with a concomitant feature of the invention, the control cryostats are disposed inside the refrigerating system. The control cryostat is disposed in a so-called "cold box" of the refrigerating system, as a result of which a particularly economic construction is provided since, in this manner, the resulting refrigeration losses can be compensated for with coolant directly at the point of supply.

Since the operating costs of superconducting magnet systems are determined, in particular, by the costs of providing the coolant for maintaining the temperature necessary for the superconduction, any minimization of refrigeration losses results in a marked reduction of these component costs so that the current supply provided for several magnets through a control cryostat according to the invention, may be considered particularly advantageous.

Furthermore, the high availability of magnet systems constructed in this manner should be particularly emphasized because, in the event of maintenance or failure of the refrigerating system, operation is possible without interruption from the control cryostat or from additional coolant reservoirs and without interrupting the operation of the superconducting magnets A further advantage of the configuration embodying a control cryostat according to the invention is that the actuating elements necessary for operating the superconducting electromagnets may all be disposed at the control cryostat so that it is possible to operate such superconducting electromagnets even in those areas which are shielded or are prohibited for other reasons Quite incidentally, the configuration of one or more superconducting electromagnets and the cryostats associated with them, together with a control cryostat according to the invention, results in a simplified cryosystem, i.e. the cause of possible refrigeration losses becomes clearly recognizable and they are simpler to control.

A further advantage which is associated with the superconducting magnet system configuration according to the invention, is the separation of the coolant supply in the refrigerating system or in the control cryostat from the cryostats associated with the individual magnets so that, for example, in the event of quenching, only small quantities of coolant are able to evaporate and a rapid recooling of the magnet is therefore possible by supplying coolant from the refrigerating system.

Other features which are considered as characteristic for the invention are set forth in the appended claims.

Although the invention is illustrated and described herein as embodied in a magnet system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
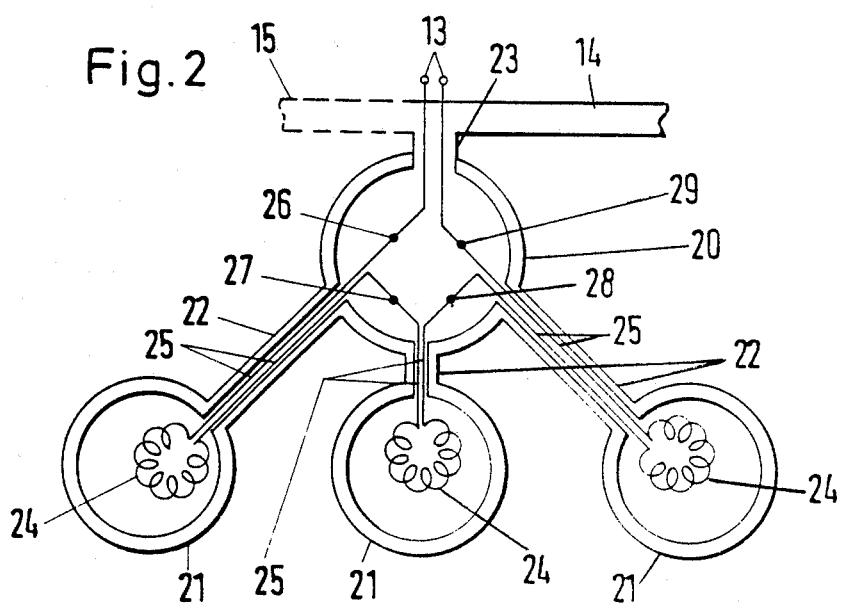

FIG. 1 is a fragmentary, diagrammatic and schematic view of a superconducting magnet system; and FIG. 2 is an enlarged view of a portion of FIG. 1 including a power supply.

Referring now to the figures of the drawing in detail and first, particularly, to FIG. 1 thereof, there is seen a diagrammatic general view of a superconducting magnet system 10 which has a refrigerating system 12 that is connected through highly insulated first coolant lines 14, 16, 18 to a multiplicity of control cryostats 20, 30, 40. The control cryostats 20, 30, 40 are in turn connected through likewise highly insulated second coolant lines 22, 32, 42 to a multiplicity of magnet cryostats 21, 31, 41, in each of which a schematically illustrated superconducting electromagnet 17 is disposed and refrigerated.

The superconducting magnet system 10 shown in FIG. 1 is only partially illustrated. Only three of a multiplicity of control cryostats 20, 30, 40 connected to the refrigerating system 12 through the coolant lines 14, 16, 18, are shown.

As shown in FIG. 2, the magnet cryostats 21, 31, 41 serve the purpose of enclosing superconducting magnet coils 24 which are manufactured from superconducting wire and are cooled to a temperature below their critical temperature by means of coolant supplied from the refrigerating system 12.

A multiplicity of further non-illustrated control cryostats may be connected to ends 15, 19 of the coolant lines shown in broken lines, depending on the refrigerating capacity of the refrigerating system 12, and depending on the refrigeration loss characteristics of the coolant lines 14, 16, 18 used for connection.

For greater clarity, a partial enlargement of the system containing the control cryostat 20 and the magnet cryostats 21 shown at the left-hand side of FIG. 1, is shown in Fig. 2.

Disposed in a flanged cover of the control cryostat 20, is a current supply lead 13 which passes through the highly efficient insulation of the coolant line 14 and is extended into the interior of the control cryostat 20. An individual current connection or conductor having the connection points 26, 27, 28, 29 is disposed in the interior of a respective control cryostat 20 and is connected to likewise superconducting connecting wires 25 of the superconducting magnet coils 24 situated in the magnet cryostats 21.

From the representation shown in FIG. 2, it is evident that, in accordance with the configuration according to the invention, the superconducting magnet coils 24 disposed in the magnet cryostats 21 are connected in parallel with each other with respect to the coolant supply thereof, but in series with each other with respect to the electrical power supply thereof.

The current supply lead 13 at the control cryostat 20 is conventionally provided with an encasing tube which is disposed in such a way that it terminates just above the liquid level of the coolant and guides the electrical conductors to the connecting points 26, 29.

The connecting conductors or current connections between the connecting points 26, 27, 28, 29 and the superconducting magnet coils 24 in the magnet cryostats 21 are constructed as superconducting cables and are accommodated in the respective coolant lines 22 which connect the control cryostat 20 to the respective magnet cryostat 21.

Obviously, it is readily possible to connect a larger number of magnet cryostats to one control cryostat. This is done by merely changing the dimensioning of the coolant capacity, i.e. of the refrigerating volume, of the control cryostat.

What is claimed:

1. Magnet system, comprising a refrigerating system supplying refrigerated coolant, first coolant lines connected to said refrigerating system, control cryostats connected to said first coolant lines, second coolant lines connected to said control cryostats, a multiplicity of magnet cryostats each being connected to a respective one of said second coolant lines, a multiplicity of electromagnets each being associated with a respective one of said magnet cryostats and each having a magnet coil formed of superconducting wire, a current supply lead supplying power for exciting said magnet coils, individual current connections each being disposed in a respective one of said control cryostats and being connected to said current supply lead, and superconducting cables each being disposed in a respective one of said second coolant lines and each being connected between one of said current connections and a respective one of said magnet coils.

2. Magnet system according to claim 1, wherein all of said electromagnets associated with a given control cryostat are electrically connected in a series current circuit having a beginning and an end in said given control cryostat and having connecting points in said given control cryostat for said superconducting cables.

3. Magnet system according to clair: 1, wherein said superconducting electromagnets associated with a given control cryostat are electrically connected in parallel with each other, said given control cryostat has connecting points disposed therein for said superconducting cables.

4. Magnet system according to claim 1, wherein each given control cryostat forms a beginning and an end of a coolant circuit and said individual superconducting cables for said given control cryostat are interconnected in said given control cryostat.

5. Magnet system according to claim 1, wherein said control cryostats serve as supply vessels for refrigerated coolant, whereby said magnet cryostats operate independently of the supply of coolant by said refrigerating system.

6. Magnet system according to claim 1, wherein said control cryostats are separate units disposed in the vicinity of said magnet cryostats.

7. Magnet system according to claim 1, wherein said control cryostats are disposed inside said refrigerating system.

* * * * *